US011403397B2

United States Patent
Zeigler et al.

(10) Patent No.: US 11,403,397 B2
(45) Date of Patent: Aug. 2, 2022

(54) CACHE SYSTEM FOR CONSISTENT RETRIEVAL OF RELATED OBJECTS

(71) Applicant: McAfee, LLC, San Jose, CA (US)

(72) Inventors: Arthur S. Zeigler, Gaston, OR (US); Eric Donald Wuehler, Beaverton, OR (US); Jonathan B. King, Hillsboro, OR (US)

(73) Assignee: McAfee, LLC, San Jose, CA (US)

( * ) Notice: Subject to any disclaimer, the term of this patent is extended or adjusted under 35 U.S.C. 154(b) by 131 days.

(21) Appl. No.: 16/863,073

(22) Filed: Apr. 30, 2020

(65) Prior Publication Data

US 2021/0342446 A1 Nov. 4, 2021

(51) Int. Cl.
*G06F 21/56* (2013.01)
*G06F 12/0891* (2016.01)
*G06F 9/30* (2018.01)

(52) U.S. Cl.
CPC ........ *G06F 21/564* (2013.01); *G06F 9/30047* (2013.01); *G06F 12/0891* (2013.01); *G06F 21/561* (2013.01); *G06F 21/565* (2013.01); *G06F 2212/7207* (2013.01)

(58) Field of Classification Search
CPC .... G06F 21/561; G06F 21/564; G06F 21/565; G06F 12/0891; G06F 16/9574; G06F 2212/7207

See application file for complete search history.

(56) References Cited

U.S. PATENT DOCUMENTS

| | | | |
|---|---|---|---|
| 6,026,413 A | 2/2000 | Challenger et al. | |
| 7,076,611 B2 | 7/2006 | Steere et al. | |
| 7,734,875 B1 | 6/2010 | Hervas | |
| 8,495,305 B2 | 7/2013 | Sundarrajan et al. | |
| 9,389,794 B2 | 7/2016 | Krig et al. | |
| 9,542,335 B1* | 1/2017 | Elving | G06F 12/121 |
| 2003/0191812 A1* | 10/2003 | Agarwalla | H04L 67/2842 709/217 |
| 2004/0107319 A1 | 6/2004 | D'Orto et al. | |
| 2006/0195660 A1* | 8/2006 | Sundarrajan | H04L 67/2852 711/118 |
| 2008/0209120 A1* | 8/2008 | Almog | H04L 67/2852 711/106 |
| 2011/0083184 A1* | 4/2011 | Upadhyay | G06F 21/564 726/24 |
| 2013/0086323 A1 | 4/2013 | Kadlabalu | |
| 2013/0159631 A1 | 6/2013 | Seufert et al. | |
| 2014/0136791 A1 | 5/2014 | Fabijancic | |

(Continued)

*Primary Examiner* — Robert B Leung
(74) *Attorney, Agent, or Firm* — Patent Capital Group

(57) ABSTRACT

An apparatus, related devices and methods, having memory; and a processor operable to execute instructions stored in the memory configured to cache a first data object and a second data object received from a source in a cache group based on metadata received from the source, where the metadata identifies the first and second data objects as related and the first data object as a trigger object; receive a request from a client for the first data object; identify, based on a determination that the first data object is invalid and is the trigger object, the first data object and the second data object as invalid; request a valid first data object and a valid second data object from the source; and cache the valid first and second data objects, received from the source, in the cache group.

20 Claims, 11 Drawing Sheets

(56) References Cited

U.S. PATENT DOCUMENTS

2015/0161048 A1\* 6/2015 Patil ..................... G06F 16/172
 711/141
2016/0048551 A1\* 2/2016 Baldwin ............. H04L 67/2847
 707/756

\* cited by examiner

--Request--
HTTP://sample-origin-server.mcafee.com/pkgcatalog.z

--Response--
HTTP/1.1 200 OK
Date: Fri, 17 Apr 2020 21:56:38 GMT
ETag: "80935ec9056ab1dda4c8a756be12fcbc:1587133825"
Server: Apache
Content-MD5: gJNeyQVqsd2kyKdWvhL8vA==
Content-Type: text/plain
Cache-Control: public, max-age=15
Accept-Ranges: bytes
Last-Modified: Fri, 17 Apr 2020 14:25:15 GMT
Proxy-Connection: Keep-Alive
Transfer-Encoding: chunked
X-Cache-Related: [pkgcatalog.z, avvdat.ini, 91599160avv.gem, 91609161avv.gem]

FIG. 3B

--Request--
HTTP://sample-origin-server.mcafee.com/avvdat.ini

--Response--
HTTP/1.1 200 OK
Date: Fri, 17 Apr 2020 21:56:38 GMT
ETag: "80935ec9056ab1dda4c8a756be12fcbc:1587133825"
Server: Apache
Content-MD5: gJNeyQVqsd2kyKdWvhL8vA==
Content-Type: text/plain
Cache-Control: public, max-age=15
Accept-Ranges: bytes
Last-Modified: Fri, 17 Apr 2020 14:25:15 GMT
Proxy-Connection: Keep-Alive
Transfer-Encoding: chunked
X-Cache-Related: [pkgcatalog.z, avvdat.ini, 91599160avv.gem, 91609161avv.gem]

FIG. 3C

--Request--
HTTP://sample-origin-server.mcafee.com/pkgcatalog.z

--Response--
HTTP/1.1 200 OK
Date: Fri, 17 Apr 2020 21:56:38 GMT
ETag: "80935ec9056ab1dda4c8a756be12fcbc:1587133825"
Server: Apache
Content-MD5: gJNeyQVqsd2kyKdWvhL8vA==
Content-Type: text/plain
Cache-Control: public, max-age=15
Accept-Ranges: bytes
Last-Modified: Fri, 17 Apr 2020 14:25:15 GMT
Proxy-Connection: Keep-Alive
Transfer-Encoding: chunked
X-Cache-Related: [/current/dat/avvdat.ini, /current/dat/91599160avv.gem, /current/dat/91609161avv.gem]

CACHE SYSTEM FOR CONSISTENT RETRIEVAL OF RELATED OBJECTS

TECHNICAL FIELD

This disclosure relates in general to processing of data in cache memory, and, more particularly though not exclusively, to a system and method for managing related data within a cache.

BACKGROUND

Computer systems typically include a cache for temporarily storing data to increase operating efficiency of the computer systems by reducing the retrieval time. For example, data associated with a website may be stored in the cache such that, in response to a subsequent request for the data (e.g., loading of a webpage), the cache may be accessed to retrieve the data instead of downloading the information directly from the source (e.g., the website). In response to a subsequent request for the information, a comparison is made between the data stored in the cache and the data from the website. If the data from the website has not changed or been updated, the data stored in the cache is provided in response to the request. If the data at the source has been changed or modified, the data stored at the cache becomes "stale" or "invalid," and the data is retrieved from the source and provided in response to the request. When data at the source changes frequently, the data stored in the cache requires more frequent downloading of the information from the data source and results in an increased use of computer system resources to respond to the request.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, not by way of limitation, in the figures of the accompanying drawings.

2

FIG. 3B is a simplified exemplary HTTP request and response for a trigger object stored within a cache group, in accordance with various embodiments of the present disclosure.

FIG. 3C is simplified exemplary HTTP request and response for a trigger object stored within a cache group having multiple trigger objects, in accordance with various embodiments of the present disclosure.

FIG. 3D is a simplified exemplary HTTP request and response for a trigger object stored separate from a cache group, in accordance with various embodiments of the present disclosure.

Figure 4:
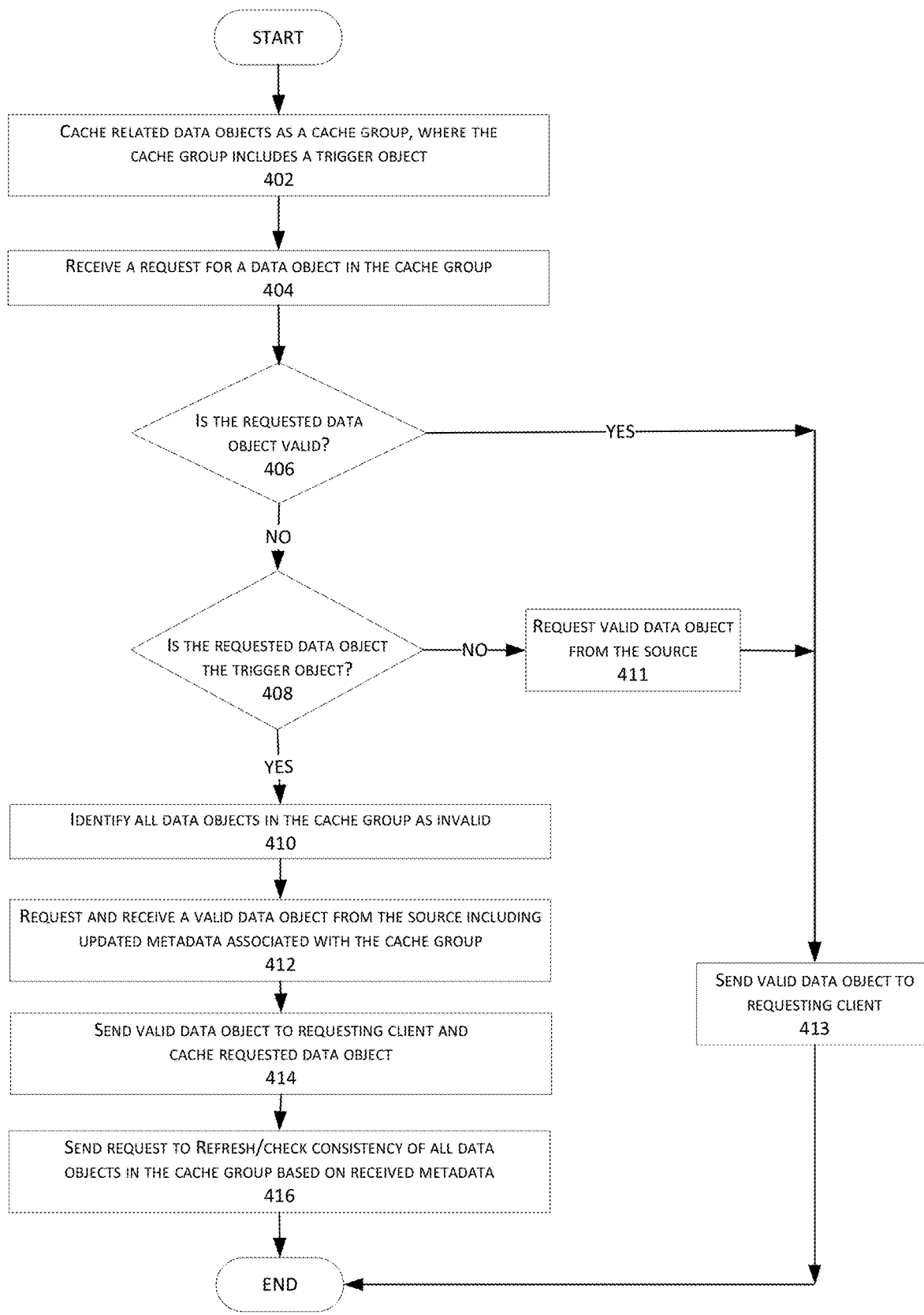

FIG. 4 is a simplified flowchart illustrating potential operations of a cache management system that may be associated with managing related objects stored in a cache group, in accordance with various embodiments of the present disclosure.

Figure 5:
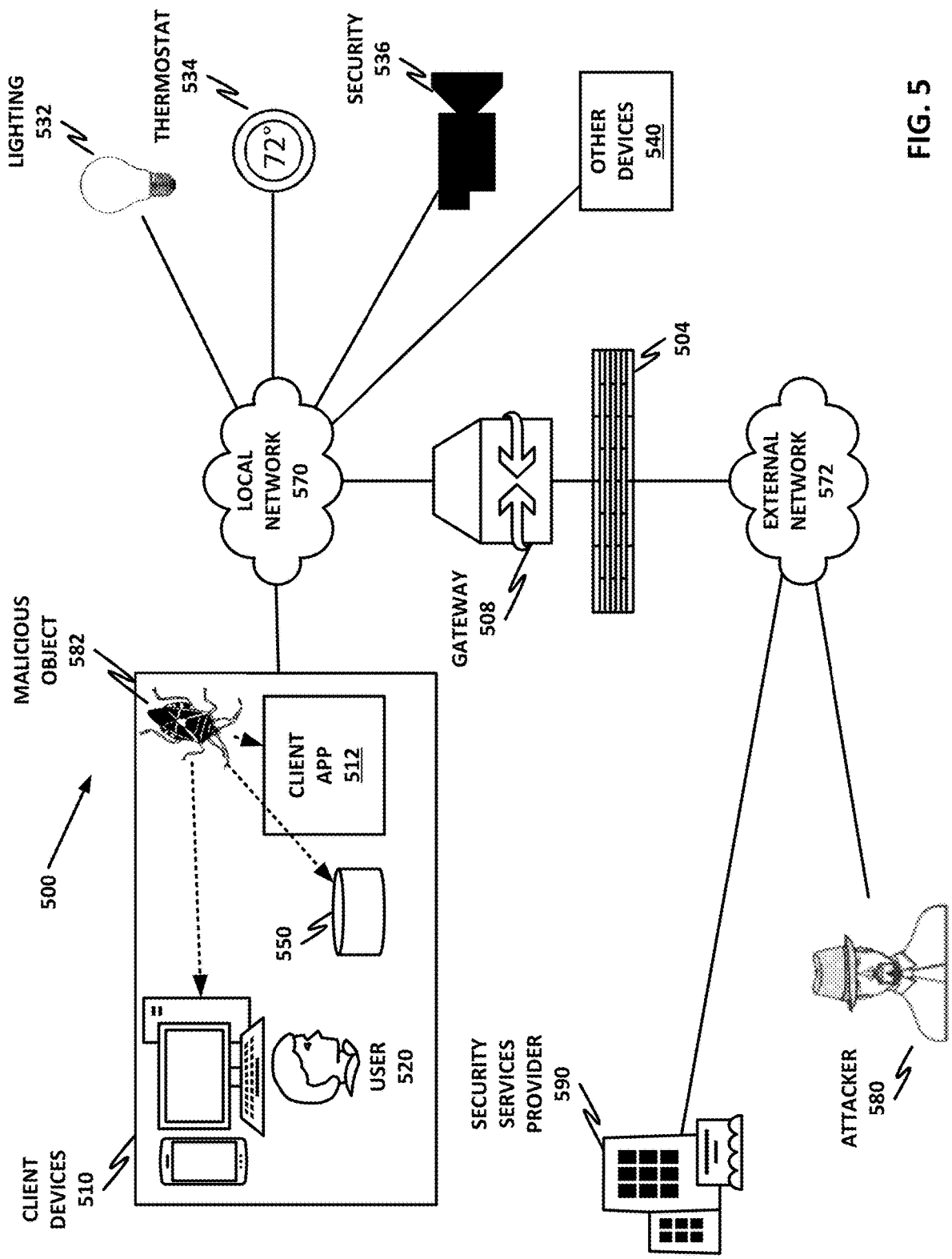

FIG. 5 is a block diagram of selected elements of a security ecosystem.

Figure 6:
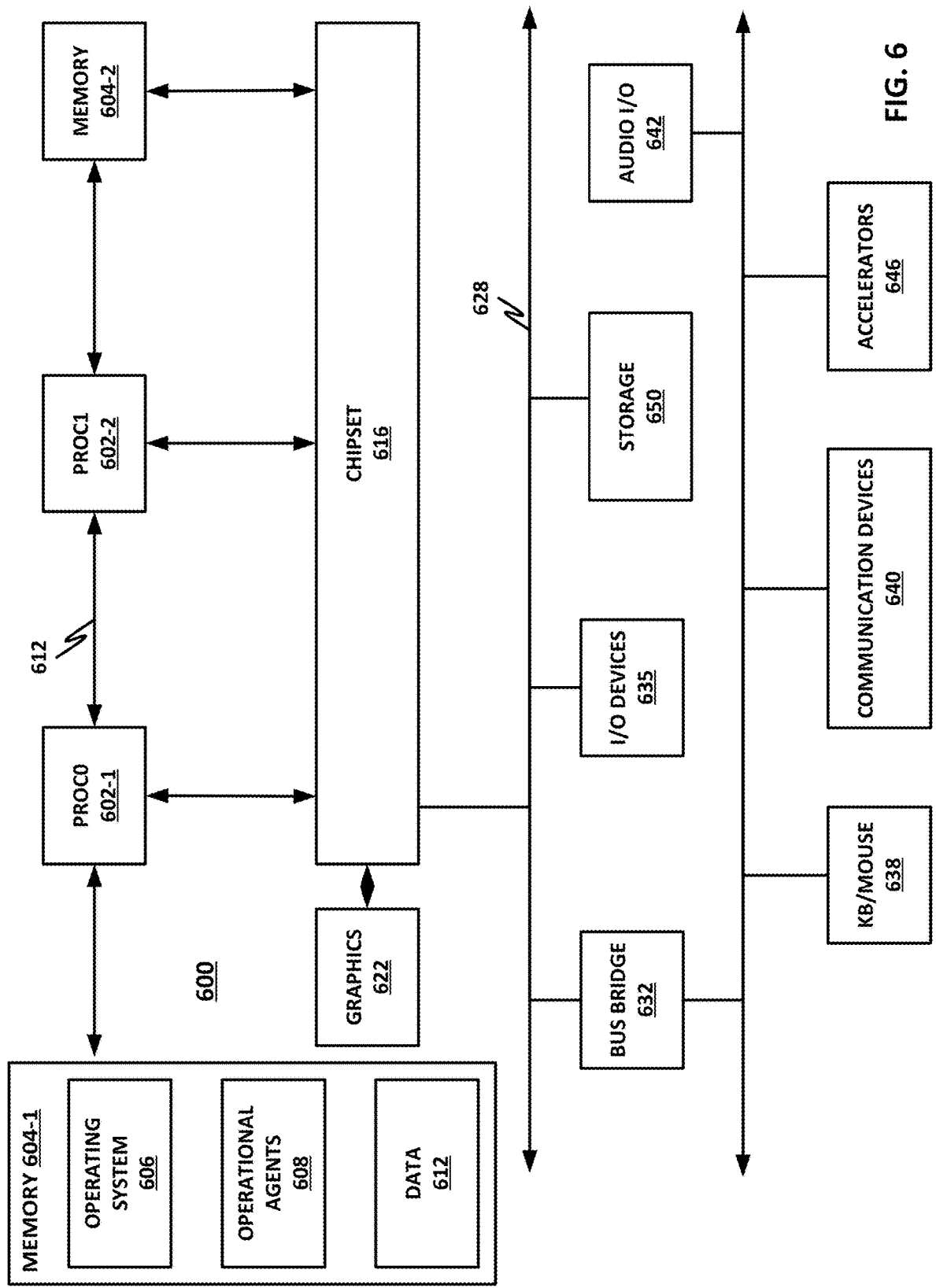

FIG. 6 is a block diagram of selected elements of a hardware platform.

DETAILED DESCRIPTION

An apparatus, including systems and methods for consistent and coherent retrieval of related objects in cache memory is disclosed herein. For example, in some embodiments, an apparatus, having a memory element operable to store instructions, and a processor operable to execute the instructions configured to cache a first data object and a second data object received from a source in a cache group based on metadata received from the source, wherein the metadata identifies the first and second data objects as related and identifies the first data object as a trigger object, receive a request from a client for the first data object, identify, based on a determination that the first data object is invalid and that the first data object is the trigger object, the first data object and the second data object as invalid, request a valid first data object and a valid second data object from the source, and cache the valid first data object and the valid second data object, received from the source, in the cache group.

In today's technological environment, computing speed is an important factor. Being able to access information quickly is imperative. Caching is a way to store content (e.g., data objects) so that, at a later time, it can be accessed more rapidly. Caching works by storing a copy of the content, that was previously requested from an origin server, in a place where it is more readily available. When subsequent requests are made for the content, the cached copy of the content is accessed and delivered instead of the original copy from the origin server. Retrieving previously requested content directly from cache is more efficient than making a request to the origin server which creates additional round trips, takes a longer time, and requires additional computer resources. When a subsequent request is made for the content, the cache is checked to see if a cached copy exists. If there is no cached copy, a "cache miss" occurs and the data is retrieved and delivered from the original source. If there is a cached copy, this results in a "cache hit" and the data, if valid (e.g., "fresh"), is delivered from cache. A valid cached copy will continue to be delivered from cache until it expires or until the cache is cleared. If a cached copy expires (e.g., the cached copy becomes invalid or "stale"), the origin server may be asked to validate it (e.g., determine whether the cached copy matches the original copy). If the original copy has been modified or updated as compared to the cached copy, the cache updates its copy from the origin server and delivers the data in response to the request. Typically, the process of checking for a cached copy, checking whether it is stale, and requesting validation is performed for each individual data file that is requested and is performed only when the request for an individual data file is made. A system and method for proactively checking and validating cached data may be desired.

In the following detailed description, reference is made to the accompanying drawings that form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense. For convenience, the phrase "FIG. 1" may be used to refer to the collection of drawings of FIGS. 1A-1B, and the phrase "FIG. 2" may be used to refer to the collection of drawings of FIGS. 2A-2C, etc. The drawings are not necessarily to scale.

The description uses the phrases "in an embodiment" or "in some embodiments," which may each refer to one or more of the same or different embodiments. Furthermore, the terms "comprising," "including," "having," and the like, as used with respect to embodiments of the present disclosure, are synonymous. For the purposes of the present disclosure, the meaning of "a," "an," and "the" include plural references. The meaning of "in" includes "in" and "on." When used to describe a range of dimensions, the phrase "between X and Y" represents a range that includes X and Y. The phrase "A and/or B" means (A), (B), or (A and B). The phrase "A, B, and/or C" means (A), (B), (C), (A and B), (A and C), (B and C), or (A, B, and C). Although certain elements may be referred to in the singular herein, such elements may include multiple sub-elements.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

Figure 1A:
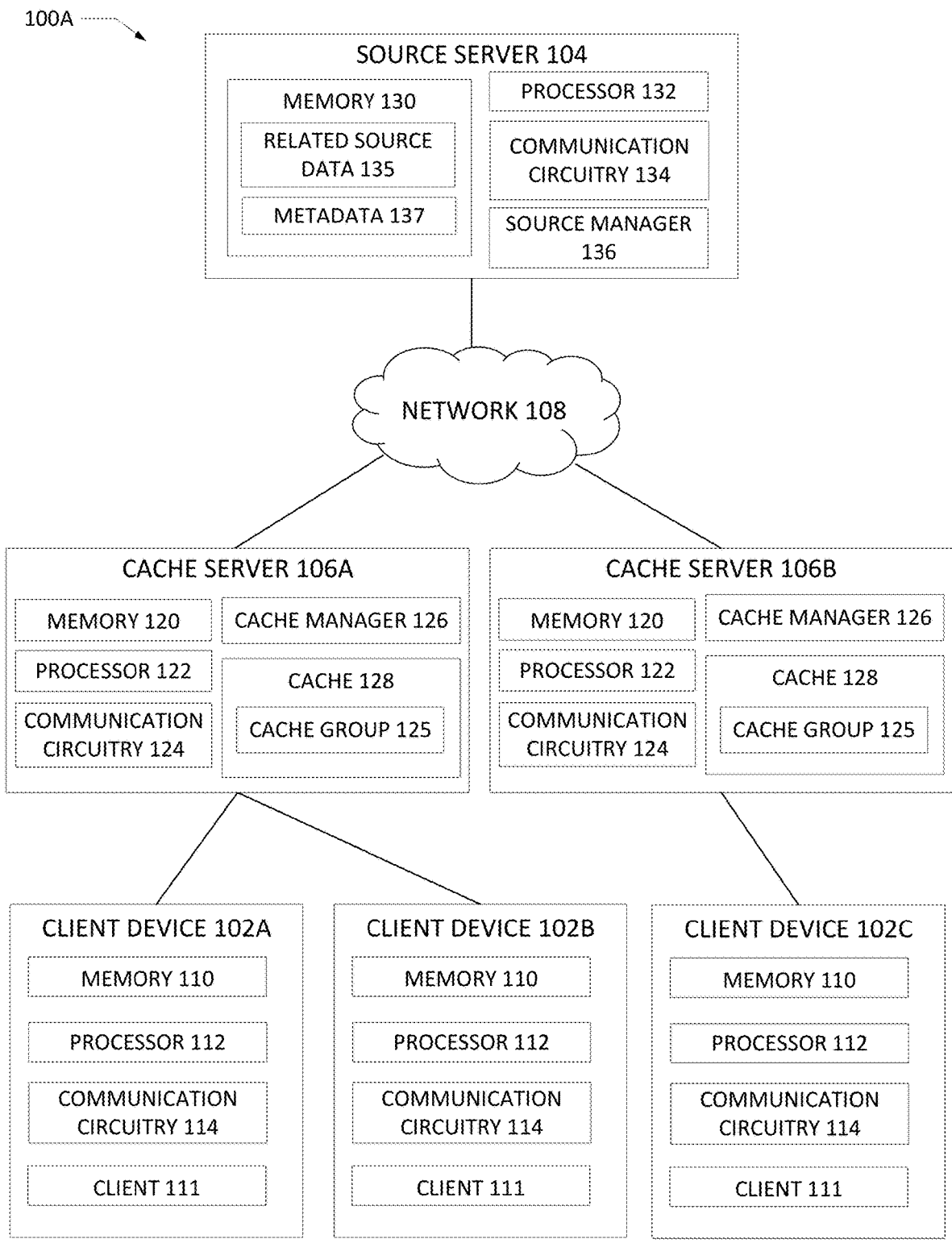
FIG. 1A is a simplified block diagram of an example cache management system for managing related objects stored in a cache group, in accordance with various embodiments of the present disclosure.

FIG. 1A is a simplified block diagram of a cache management system 100A that enables the consistent and coherent retrieval of related objects stored in a cache group, in accordance with various embodiments. As illustrated in FIG. 1A, an embodiment of a cache management system 100A may include a client device 102, a source server 104, a cache server 106, and a network 108. The client device 102 may be an electronic device and may include memory 110, a processor 112, communication circuitry 114, and a client 111. The source server 104 may include memory 130, a processor 132, communication circuitry 134, and a source manager 136 that manages related source data 135 and metadata 137 associated with the related source data 135 stored in memory 130. The source manager 136 may be in communication with the memory 130, the processor 132, and the communication circuitry 134 to perform the operations described herein. The cache server 106 may include a memory 120, a processor 122, communication circuitry 124, a cache 128, a cache group 125, and a cache manager 126. The cache group 125 is a cached copy of the related source data 135 that links the related source data and includes a trigger file to maintain all content within the cache group 125 in a consistent state, as described in more detail below with reference to FIG. 3. As used herein, related source data 135 may include individual data files that are associated data objects or that are part of a collection of data, for example, virus identification files in the Master Repository for McAfee® ePolicy Orchestrator. The cache manager 126 may manage the cache 128 by storing data objects, including in a cache group 125, by requesting validation for a data object, by marking a data object as expired, and by requesting an updated data object from the source server 104. The cache manager 126 may store related data objects in a cache group 125 based on metadata included in a data object header from the source server 104. In some embodiments, the source manager 136 includes the metadata in the data object header before sending the data object in response to a request. In some embodiments, the source manager 136 includes a message in the data object header instructing the cache manager 126 to request, from the source server 104, the information for caching the data object and related data objects in a cache group 125. The cache manager 126 may be in communication with the memory 120, the processor 122, and the communication circuitry 124 to perform the operations described herein. The client device 102, the source server 104, and the cache server 106 may be in communication using network 108. The cache management system 100A is an example of a single layer of cache (e.g., cache server 106). In some embodiments, the cache management system may include multiple layers of cache, for example, as described below with reference to FIG. 1B.

The cache management system 100A may be configured to manage the storage of related source data in a cache group and to transmit the related source data to the client device in response to a client request. For example, the client 111 makes a first request for a data object (e.g., an individual data file) included in the related source data 135. The cache manager 126 checks the cache 128 to determine whether the requested data object exists in the cache group 125. If the requested data object does not exist, the cache manager 126 requests the data object from the source server 104. The cache manager 126 receives the data object from the source server 104, which includes metadata and/or header information providing instructions on how to cache the data object in a cache group with related source data and identifying whether the data object is a trigger object. In some embodiments, the metadata and/or header information is added to the requested data object by the source manager 136. After the requested data object is received from the source server 104, the cache manager 126 sends the requested data object to the client 111. When the client makes a second request for the data object, the cache manager 126 checks the cache 128 and, if the requested data object exists and is not expired, the cache manager 126 delivers the requested data object from cache 128 to the client 111. If the requested data object is expired, the cache manager 126 requests validation and/or requests an updated version of the data object from the source server 104 to be delivered to the client 111. If the requested data object is the trigger object, based on the trigger object being expired (e.g., invalid), the cache manager 126 identifies all content in the cache group as expired and sends requests to the source server 104 for all content in the cache group to be validated and/or updated.

The client device 102 may be a network element and include, for example, desktop computers, laptop computers, mobile devices, personal digital assistants, smartphones, tablets, or other similar devices. The client device 102 also may be referred to herein as "user device" or "electronic device." The client device 102 may include one or more processors 112 for executing any type of instructions associated with the client device achieving the operations detailed herein. The processor 112 is connected to memory 110, communication circuitry 114, and client 111. The client 111 may include any application or process of the client device 102, for example, an anti-malware program such as McAfee® Total Protection. The memory 110 may store computer executable instructions or computer executable components as well as other data. The processor 112 executes computer executable instructions stored in memory 110. For example, the processor 112 may execute instructions from the client 111 and stored in memory 110. In some embodiments, the client 111 may have a designated memory and a processor, different from the memory 110 and the processor 112, that store and execute instructions from the client 111. The communication circuitry 114 may be used to send and receive commands, requests, and other data to and from the client device 102. Although FIG. 1A shows three client devices 102A, 102B, and 102C, the cache management system 100A may include any suitable number of client devices, including one or more.

The client device 102 may include one or more memory elements 110 for storing information and data. The one or more memory elements 110 may include one or more volatile and/or non-volatile memory devices such as, but not limited to, magnetic storage devices, read only memory (ROM), random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof. The memory 110 may store program instructions that are loadable and executable on the processor(s) as well as data generated or received during the execution of these programs. The memory 110 may have stored thereon software modules and/or instructions associated with other components of the device. The memory 110 may include one or more operating systems (O/S) application software.

The processor 112 may be based on one or more processors, microcontrollers, microprocessors, and programmable logic devices, among others. For example, the one or more processors 112 of the client device 102 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The processors may be implemented in hardware, or combinations of hardware, and software and/or firmware, as appropriate. Software or firmware implementations of the processors may include computer-executable or machine-executable instructions written in any suitable programming language to perform the various functions described. Hardware implementations of the processors may be configured to execute computer-executable or machine-executable instructions to perform the various functions described. The client device 102 may include a chipset (not shown) for controlling communications between one or more processors and one or more of the other components of the device. The processors 112 may also include one or more application specific integrated circuits (ASICs) or application specific standard products (ASSPs) for handling specific data processing functions or tasks.

The client device 102 may include communication circuitry 114. The communication circuitry 114 of the client device 102 may be embodied as any communication circuitry, device, or collection thereof, capable of enabling communications between the client device 102 and other remote devices (e.g., cache server 106 and/or source server 104). The terms "communication circuitry" and "input/output (I/O) circuitry" may be used interchangeably herein. The communication circuitry 114 may be configured to use any one or more communication technology (e.g., wireless or wired communications) and associated protocols (e.g., Ethernet, Bluetooth®, Wi-Fi®, WiMAX, etc.) to effect such communication. The client device 102 may further include GPS and other location identifiers. The client device 102 may further include peripheral devices (not shown), which may include any number of additional peripheral or interface devices and associated I/O circuitry, such as speakers, microphones, additional storage devices, among others.

Source server 104 may include memory 130, a processor 132, communication circuitry 134, and a source manager 136. The processor 132 is connected to memory 130 and communication circuitry 134. The processor 132 may be based on one or more processors, microcontrollers, microprocessors, and programmable logic devices, among others, and may include any of the processors described above with reference to processor 112. Memory 130 may store computer executable instructions or computer executable components as well as other data, and may include any of the memory described above with reference to memory 110. The processor 132 executes computer executable instructions stored in memory 130. The communication circuitry 134 may be used to send and receive commands, requests, and other data to and from the source server 104. The source manager 136 may manage related source data 135 and metadata 137 stored in memory 130. For example, the source manager 136 may generate metadata 137 for related source data 135, may process requests to validate source data, and may send source data with metadata to the cache server 106 in response to a request for source data. The source server 104 may include any data server, for example, a Content Delivery Network (CDN) that manages, stores, and delivers content to clients. A CDN may use dedicated cache servers (e.g., cache server 106) for caching assets and web resources. The cache servers may be located in many geographic regions and used to store and deliver data so that a client's request and response travels less far as compared to the source server.

The cache server 106 may include a memory 120, a processor 122, communication circuitry 124, a cache 128, and a cache manager 126. The processor 122 is connected to the memory 120, the communication circuitry 124, the cache 128 and the cache manager 126. The processor 122 may be based on one or more processors, microcontrollers, microprocessors, and programmable logic devices, among others, and may include any of the processors described above with reference to processor 112. Memory 120 may store computer executable instructions or computer executable components as well as other data, and may include any of the memory described above with reference to memory 110. The processor 122 executes computer executable instructions stored in memory 120. The communication circuitry 124 may be used to send and receive commands, requests, and other data to and from the cache server 106.

The cache manager 126 manages the cache 128 by requesting data objects from the source server 104, by caching data objects received from the source server 104, including storing data objects that are related in a cache group 125, by requesting validation for cached data objects from the source server 104, by identifying cached data objects, including all data objects in the cache group 125, as expired, by requesting updated data objects, including related source data 135 based on the metadata 137, and by delivering requested data objects to the client 111. The source manager 136 may control how related source data 135 is cached by the cache manager 126 by including cache-directive headers (e.g., metadata) with data objects. For example, the cache directive headers may include information identifying an object as related to other data objects such that the object is stored in a cache group and may further include information identifying the object as a trigger object. In some embodiments, the source manager 136 may help determine if a cached data object is still valid by including expiration information in the cache-directive header, as described in detail below with reference to FIG. 3. The validation information may help determine whether to make a request for the data object from the source server 104, which reduces load times and minimizes system resources when the data object may be retrieve directly from cache 128.

Network 108 represents interconnected communication paths for receiving and transmitting packets of information that propagate through the cache management system 100. Network 108 may provide a communicative interface between devices and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication. Network 108 may include a network controller.

In cache management system 100, network traffic, which is inclusive of packets, frames, signals, and data, among others, may be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may be provided. Suitable interfaces and infrastructure may be provided to enable communication with the cellular network.

The term "packet" as used herein, refers to a unit of data that may be routed between networked devices or between a device and the source server 104. A packet may include a source network address and a destination network address. These network addresses may be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, and/or data. The terms "data," "data object," "content," and "source data" may be used interchangeably herein.

As used in any embodiment herein, the term "module" may refer to hardware, firmware and/or circuitry configured to perform any of the aforementioned operations. A module also may include software. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry," as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms a part of one or more devices, as defined previously. The terms "module," "engine," and "administrator" may be used interchangeably herein.

Figure 1B:
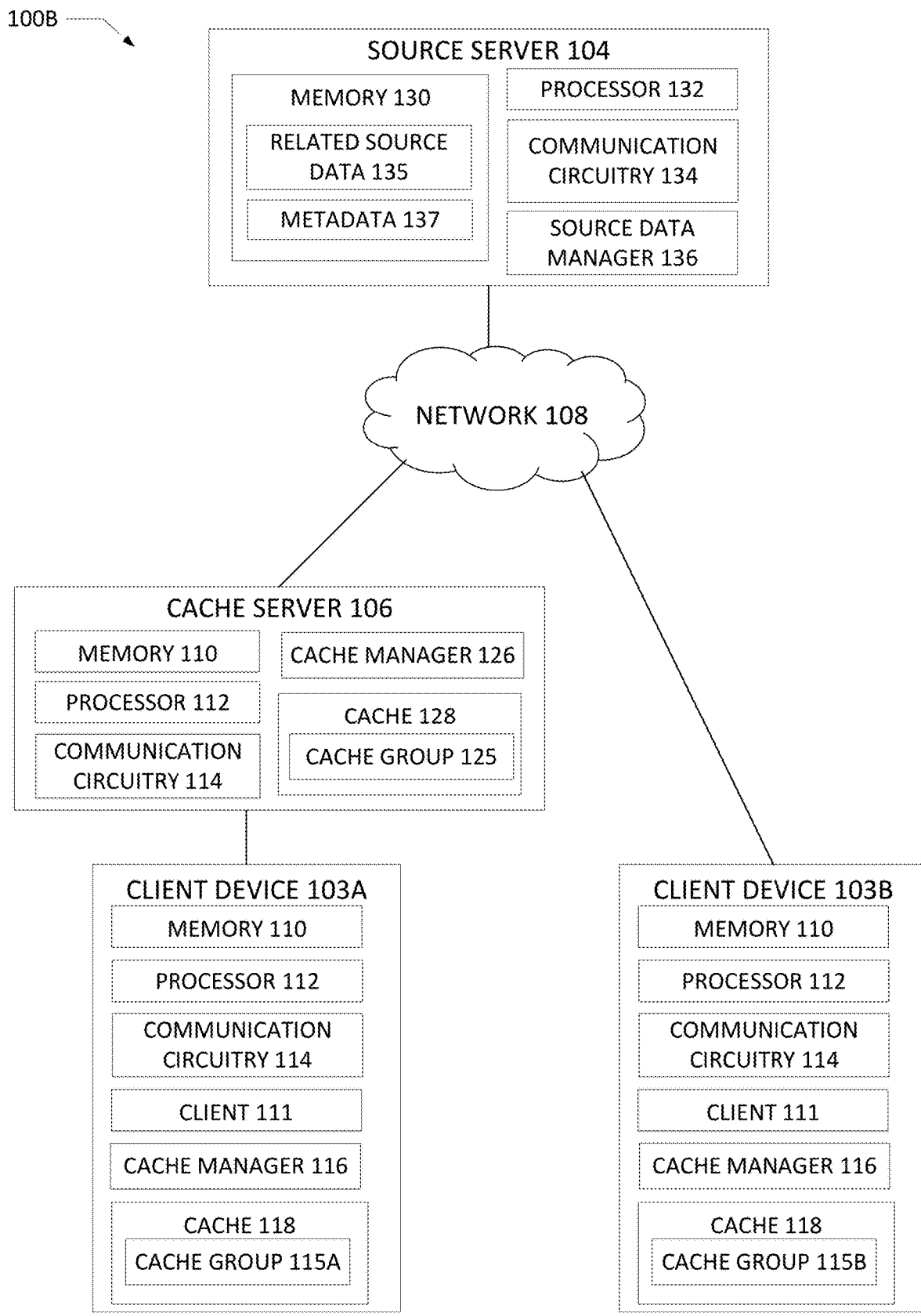
FIG. 1B is a simplified block diagram of another example cache management system for managing related objects stored in a cache group, in accordance with various embodiments of the present disclosure.

FIG. 1B is a simplified block diagram of another example cache management system 100B having multiple layers of cache for managing related objects stored in a cache group, in accordance with various embodiments of the present disclosure. As illustrated in FIG. 1B, another embodiment of a cache management system 100B may include client devices 103A, 103B, a source server 104, a cache server 106, and a network 108. The client device 103A depicts a multi-level cache with a first cache 128 on the cache server 106 and a second cache 118 on the client device 103A. The client device 103B depicts a single-level cache where the cache 118 is located on the client device 103B. The client devices 103A, 103B, the source server 104, and the cache server 106 may be in communication using network 108. The client device 103 may be an electronic device and may include memory 110, a processor 112, communication circuitry 114, a client 111, a cache manager 116, a cache 118, and a cache group 115 stored in the cache 118. The cache manager 116, the cache 118, and the cache group 115 on the client device 103 is similar to the cache manager 126, the cache 128, and cache group 125 of the cache server 106 and are as described above with reference to FIG. 1A. The memory 110, the processor 112, the communication circuitry 114, and the client 111 of client device 103 are as described above with reference to the client device 102 of FIG. 1A. Although FIG. 1B shows two client devices 103A and 103B, and a single cache server 106, the cache management system 100B may include any suitable number and arrangement of client devices 103 and cache servers 106.

The client device 103 includes a cache 118 for caching objects, including the cache group 115, locally on the client device. The cache group 115 is a cached copy of the related source data 135 that links the related source data and includes a trigger file to maintain all content within the cache group 115 in a consistent state. The cache manager 116 may manage the cache 118 by storing data objects, including in the cache group 115, by requesting validation for a data object, by marking a data object as expired, and by requesting an updated data object. The cache manager 116 may be in communication with the memory 110, the processor 112, and the communication circuitry 114 to perform the operations described herein.

The cache manager 116 on the client device 103A manages the cache 118 and the cache group 115A by making requests to the cache server 106, and the cache server 106 manages the cache 128 by making requests to the source server 104. For example, when the client 111 requests a data object, the cache manager 116 first checks cache 118. If the requested data object is not available or invalid, the cache manager 116 requests a valid data object from the cache server 106. The cache manager 126 checks the cache 128 for the data object. If the requested data object is not available or invalid, the cache manager 126 requests a valid data object from the source server 104. The source server 104 returns the requested data object to the cache server 106, and the cache server 106 returns the requested data object to the client device 103A. The cache manager 116 delivers the data object to the client 111 and stores the data object in the cache 118.

The cache manager 116 on the client device 103B manages the cache 118 and cache group 115B by making requests directly to the source server 104. For example, when the client 111 requests a data object, the cache manager 116 first checks cache 118. If the requested data object is not available or invalid, the cache manager 116 requests a valid data object from the source server 104. The source server 104 returns the requested data object to the client device 103B. The cache manager 116 delivers the data object to the client 111 and stores the data object in the cache 118.

Figure 2A:
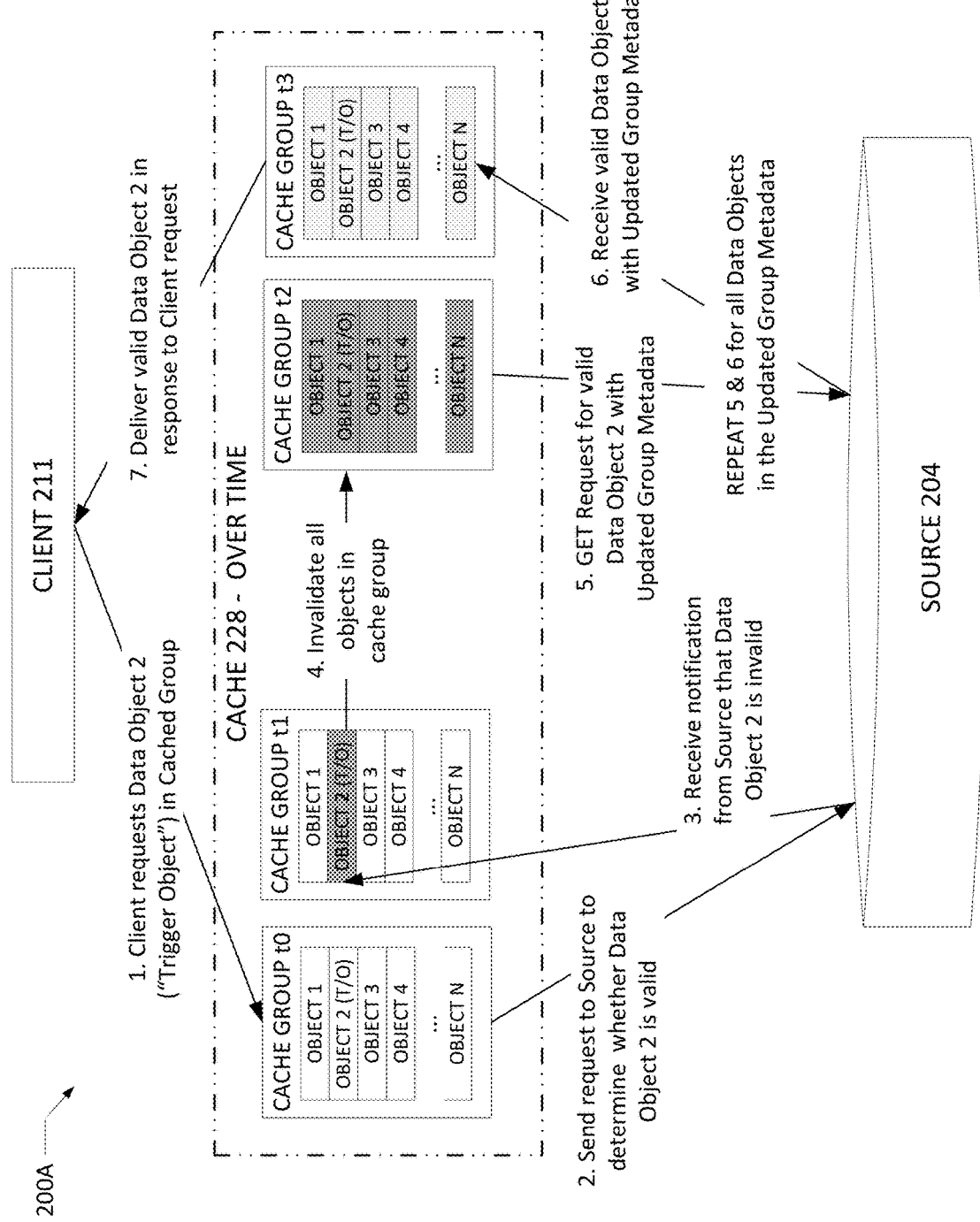
FIG. 2A is a simplified block diagram illustrating potential operations that may be associated with the cache management system where a trigger object is a cached object of the cache group, in accordance with various embodiments of the present disclosure.

FIG. 2A is a simplified block diagram illustrating potential operations that may be associated with the cache management system 200A in managing the cache content over time where a trigger object is a cached object of the cache group, in accordance with various embodiments. As illustrated in FIG. 2A, the cache management system 200A may include a client 211 (e.g., similar to client 111 in FIG. 1), a source 204 (e.g., similar to the source server 104 of FIG. 1), and the cache 228 (e.g., similar to cache 128 and cache 118 of FIG. 1). FIG. 2A illustrates a cache group (e.g., cache group 115 or 125 of FIG. 1) stored in the cache 228 over four time periods (i.e., an original time (t0), a first time (t1), a second time (t2), and a third time (t3)). The cache group includes related Data Objects 1 through N, where Data Object 2 is a trigger object (T/O). When the client 211 requests a data object that is a non-trigger object, such as Data Object 1, the cache management system 200A may function as a tradition cache by checking for a valid copy of the requested data object and returning the valid data object to the client either from the cache 228 or from the source 204. When the client 211 requests a data object that is a trigger object, such as Data Object 2, the cache management system may function to maintain the data objects in the cache group in a consistent state. First, at t0, the client 211 requests Data Object 2, which is a trigger object in the cache group. Second, the cache 228 determines whether the Data Object 2 is valid. In some embodiments, the cache 228 determines whether the Data Object 2 is valid by checking the header information. In some embodiments, the cache 228 determines whether the Data Object 2 is valid by sending a validation request to the source 204. Third, the cache 228 receives notification that the Data Object 2 is invalid (e.g., expired or stale). At t1, the cache identifies Data Object 2 as invalid (e.g., as illustrated by the darkly shaded region). Fourth, at t2, the cache 228 identifies all data objects in the cache group as invalid (e.g., as illustrated by the darkly shaded regions) based on the trigger object, Data Object 2, being invalid. As used herein, a data object that is identified as "invalid" indicates that the data object requires a validity check and/or an update. Fifth, the cache 228 requests a valid Data Object 2 from the source 204 (e.g., makes a GET request to the source). Sixth, at t3, the cache 228 receives the valid Data Object 2, which includes updated cache group metadata, and caches the valid Data Object 2 (e.g., as illustrated by the lightly shaded region). The cache 228, based on the updated cache group metadata, repeats steps 5 and 6 for each data object in the cache group to make the data objects valid and consistent (e.g., requests updated data objects for each data object in the cache group and caches the valid data objects, as illustrated by the lightly shaded regions). Seventh, the cache 228 delivers the valid Data Object 2 to the client 211. In some embodiments, the cache 228 delivers the valid Data Object 2 to the client 211 prior to caching.

Figure 2B:
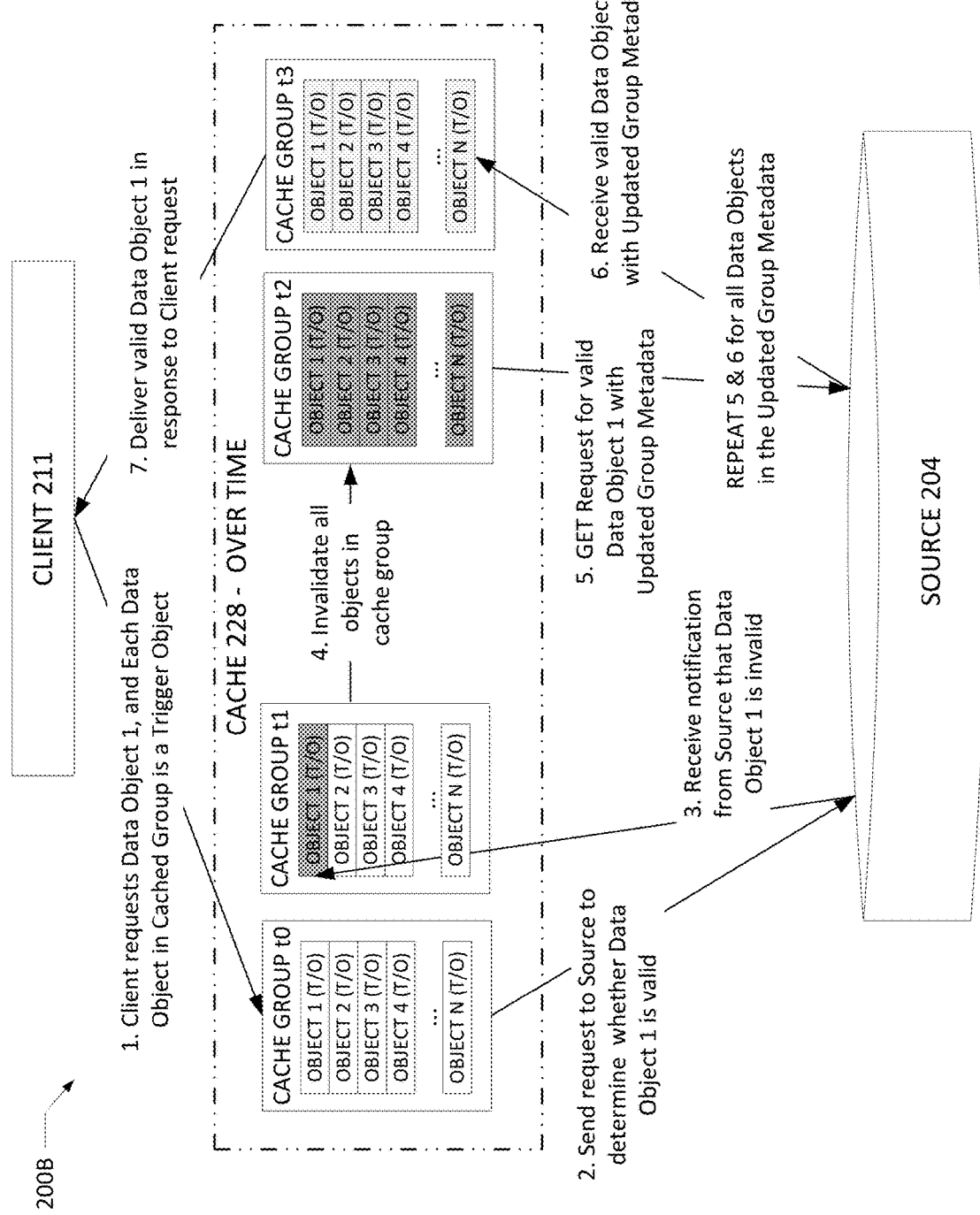
FIG. 2B is a simplified block diagram illustrating potential operations that may be associated with the cache management system where multiple objects in the cache group are trigger objects, in accordance with various embodiments of the present disclosure.

FIG. 2B is a simplified block diagram illustrating potential operations that may be associated with the cache management system 200B in managing the cache content over time where multiple objects in the cache group are trigger objects, in accordance with various embodiments of the present disclosure. As illustrated in FIG. 2B, the cache management system 200B may include the elements of the cache management system 200A in FIG. 2A, with the exception that the cache group includes related Data Objects 1 through N, where each Data Object 1 through N is a trigger object (T/O). When the client 211 requests a data object that is a trigger object, such as any Data Object 1-N, the cache management system may function to maintain the data objects in the cache group in a consistent state. First, at t0, the client 211 requests Data Object 1, which is a trigger object in the cache group. Second, the cache 228 determines whether the Data Object 1 is valid. In some embodiments, the cache 228 determines whether the Data Object 1 is valid by checking the header information. In some embodiments, the cache 228 determines whether the Data Object 1 is valid by sending a validation request to the source 204. Third, the cache 228 receives notification that the Data Object 1 is invalid (e.g., expired or stale). At t1, the cache identifies Data Object 1 as invalid (e.g., as illustrated by the darkly shaded region). Fourth, at t2, the cache 228 identifies all data objects in the cache group as invalid (e.g., as illustrated by the darkly shaded regions) based on the trigger object, Data Object 1, being invalid. Fifth, the cache 228 requests a valid Data Object 1 from the source 204 (e.g., makes a GET request to the source). Sixth, at t3, the cache 228 receives the valid Data Object 1, which includes updated cache group metadata, and caches the valid Data Object 1 (e.g., as illustrated by the lightly shaded region). The cache 228, based on the updated cache group metadata, repeats steps 5 and 6 for each Data Object 1-N in the cache group to make the data objects valid and consistent (e.g., requests an updated data object for each data object in the cache group and caches the valid data objects, as illustrated by the lightly shaded regions). Seventh, the cache 228 delivers the valid Data Object 1 to the client 211. In some embodiments, the cache 228 delivers the valid Data Object 1 to the client 211 prior to caching. Although FIG. 2B illustrates all Data Objects 1-N in the cache group as being trigger objects, in some embodiments, a cache group may include less than all data objects in the cache group being trigger objects (e.g., where between 2 and N−1 Data Objects are trigger objects).

Figure 2C:
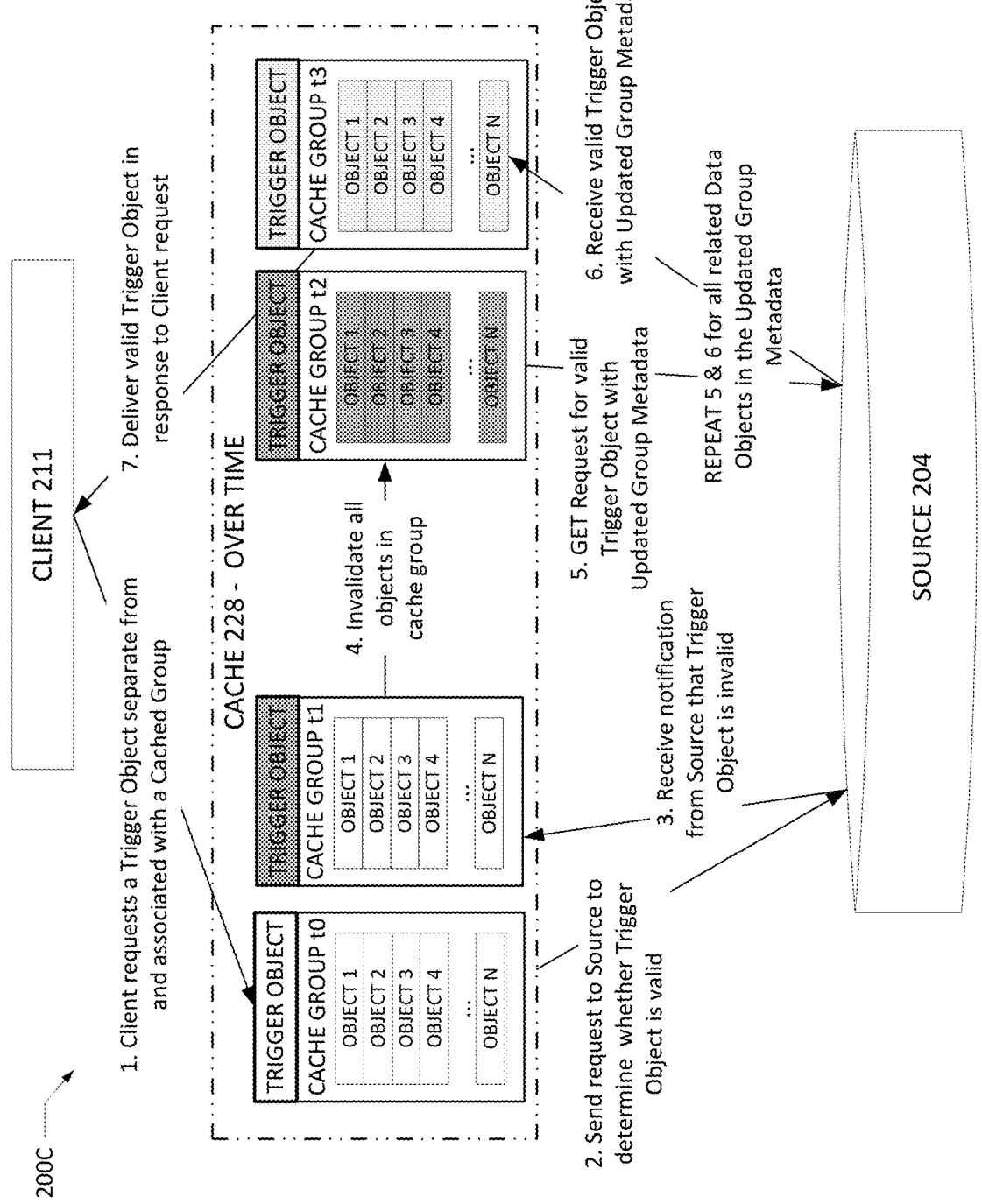
FIG. 2C is a simplified block diagram illustrating potential operations that may be associated with the cache management system where a trigger object is separate from the cache group, in accordance with various embodiments of the present disclosure.

FIG. 2C is a simplified block diagram illustrating potential operations that may be associated with the cache management system 200C in managing the cache content over time where a trigger object is separate from the cache group, in accordance with various embodiments of the present disclosure. As illustrated in FIG. 2C, the cache management system 200C may include the elements of the cache management system 200A of FIG. 2A, with the exception that a trigger object is stored separate from the cache group (i.e., the trigger object has a different URI relative path than the cache group). When the client 211 requests the trigger object, the cache management system 200C may function to maintain the data objects in the cache group in a consistent state. In some embodiments, the trigger object may be a related data object of the cache group that is stored separately from the cache group. In some embodiments, the trigger object may be an unrelated data object that is created to aid the cache management system 200C in maintaining the cache group. First, at t0, the client 211 requests the trigger object. Second, the cache 228 determines whether the trigger object is valid. In some embodiments, the cache 228 determines whether the trigger object is valid by checking the header information. In some embodiments, the cache 228 determines whether the trigger object is valid by sending a validation request to the source 204. Third, the cache 228 receives notification that the trigger object is invalid (e.g., expired or stale). At t1, the cache identifies the trigger object as invalid (e.g., as illustrated by the darkly shaded region). Fourth, at t2, the cache 228 identifies all data objects in the cache group as invalid (e.g., as illustrated by the darkly shaded regions) based on the trigger object being invalid. Fifth, the cache 228 requests a valid trigger object from the source 204 (e.g., makes a GET request to the source). Sixth, at t3, the cache 228 receives the valid trigger object, which includes updated cache group metadata, and caches the valid trigger object (e.g., as illustrated by the lightly shaded region). The cache 228, based on the updated cache group metadata, repeats steps 5 and 6 for each Data Object 1-N in the cache group to make the data objects valid and consistent (e.g., requests an updated data object for each data object in the cache group and caches the valid data objects, as illustrated by the lightly shaded regions). Seventh, the cache 228 delivers the valid trigger object to the client 211. In some embodiments, the cache 228 delivers the valid trigger object to the client 211 prior to caching.

Figure 3A:
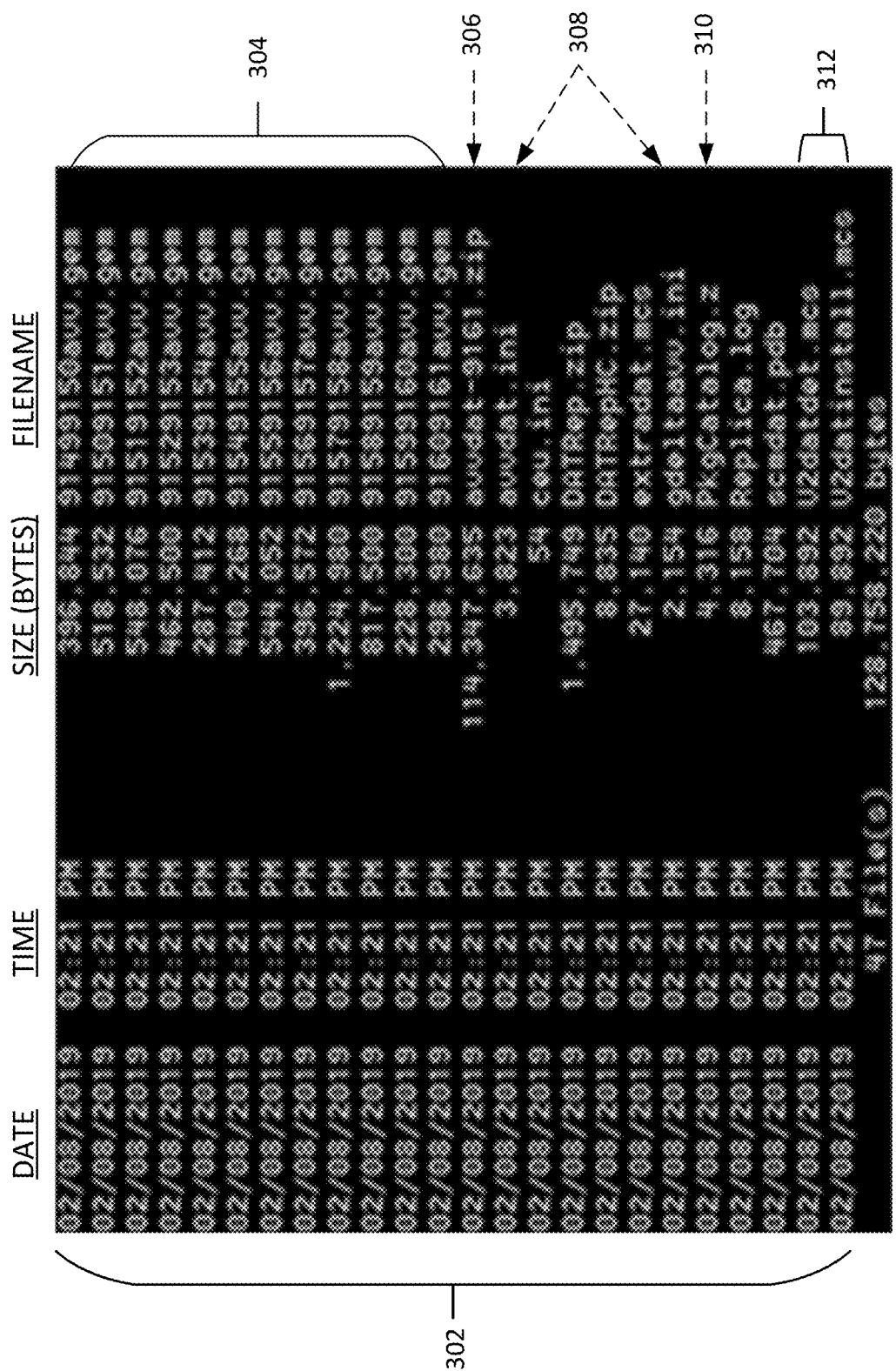
FIG. 3A is an exemplary table for identifying related objects stored in a cache, in accordance with various embodiments of the present disclosure.

FIG. 3A is an exemplary table for identifying related objects stored in a cache, in accordance with various embodiment of the present disclosure. The table of FIG. 3A depicts an ePO Master Repository for maintaining an antivirus definition set that includes multiple data files for detecting malware. The antivirus definition set is updated regularly to add related data files. For example, file 91609161avv.gen includes the antivirus definition content of file 91599160avv.gen plus one day of additional content, such that file 91599160avv.gen (i.e., a first data object) is a first antivirus definition set and file 91609161avv.gen (i.e., a second data object) is an incremental update of the first antivirus definition set. As shown in FIG. 3A, these related data files 302 (e.g., to be stored as a cache group) may be synchronized to expire as a unit. The table includes a date column, a time column, a file size column, and a file name column. As shown in FIG. 3A, each individual file of the related files 302 are synchronized to have the same date (e.g., Feb. 2, 2019) and the same time (02:21 PM). Although FIG. 3A shows the related files 302 as being synchronized and having a same timestamp, in some embodiments, the related files may be synchronized and may not have a same timestamp. The related data files 302 include incremental files 304, a full DAT file 306, reference and index files 308, a package catalog 310, detection and install scripts files 312, among others. The incremental data files may include malware detection content added incrementally over a period of time, for example, new malware detection content discovered in the past 35 days (e.g., new malware detection content for Day 35 are added to Day 34, which includes the previous 34 days of malware detection content). The contents of the table are summarized in the last row, where a total of 47 files having a total size of 128,758,220 bytes are included in the table. Metadata may be included with each related data file such that when a request is made for an individual data file, the data file and the associated metadata may be returned to instruct a cache to file the related data files 302 in a cache group and identify one or more of the data files as a trigger object.

FIG. 3B is a simplified exemplary HTTP request and response for a trigger object stored within a cache group, in accordance with various embodiments of the present disclosure. FIG. 3B shows an HTTP request for data object pkgcatalog.z of FIG. 3A and an HTTP response including headers "Cache-Control" and "X-Cache-Related." The Cache-Control header specifies that the data object pkgcatalog.z can be stored on a public caching server and for a maximum duration of 15 seconds. The X-Cache-Related header specifies that data objects pkgcatalog.z, avvdat.ini, 91599160avv.gem, and 91609161avv.gem are related and are to be stored as a cache group, where data object pkgcatalog.z is a trigger object stored with the cache group. The X-Cache-Related header will be included with a response to a request for a trigger object, but will not be included with a request for non-trigger data objects. As shown in FIG. 3B, a cache manager (e.g., cache manager 116, 126 of FIG. 1) may request a valid copy of trigger object pkgcatalog.z, such as via an HTTP request, from a source server (e.g., source server 104 of FIG. 1). The source server responds with a valid copy of the trigger object and an HTTP response that includes the X-Cache-Related header that identifies the related data objects stored as a cache group (i.e., data objects pkgcatalog.z, avvdat.ini, 91599160avv.gem, and 91609161avv.gem). Based on the response header for the trigger object pkgcatalog.z, the cache manager requests a valid copy of each data object in the X-Cache-Related header to maintain the cache group in a consistent state, as described above with reference to FIG. 2A.

FIG. 3C is simplified exemplary HTTP request and response for a trigger object stored within a cache group having multiple trigger objects, in accordance with various embodiments of the present disclosure. FIG. 3C shows an HTTP request for data object avvdat.ini of FIG. 3A, where avvdat.ini and pkgcatalog.z are both trigger objects, and an HTTP response including headers "Cache-Control" and "X-Cache-Related." The X-Cache-Related header specifies that data objects pkgcatalog.z, avvdat.ini, 91599160avv.gem, and 91609161avv.gem are related and are to be stored as a cache group, where data object avvdat.ini is a trigger object stored with the cache group. The X-Cache-Related header will be included with a response to a request for a trigger object, but will not be included with a request for non-trigger data objects. A cache manager may request a valid copy of trigger object avvdat.ini from a source server. The source server responds with a valid copy of the trigger object and an HTTP response that includes the X-Cache-Related header that identifies the related data objects stored as a cache group (i.e., data objects pkgcatalog.z, avvdat.ini, 91599160avv.gem, and 91609161avv.gem). Based on the response header for the trigger object avvdat.ini, the cache manager requests a valid copy of each data object in the X-Cache-Related header to maintain the cache group in a consistent state, as described above with reference to FIG. 2B.

FIG. 3D is a simplified exemplary HTTP request and response for a trigger object stored separate from a cache group, in accordance with various embodiments of the present disclosure. FIG. 3D shows an HTTP request for data object pkgcatalog.z of FIG. 3A and an HTTP response including headers "Cache-Control" and "X-Cache-Related." The X-Cache-Related header specifies that data objects avvdat.ini, 91599160avv.gem, and 91609161avv.gem are related and are to be stored as a cache group in a same location (i.e., the X-Cache-Related header identifies the related data objects and a location, or a same URI relative path, of the related data objects). The data object pkgcatalog.z is a trigger object that is stored separate from the cache group (i.e., has a different URI relative path). A cache manager may request a valid copy of trigger object pkgcatalog.z from a source server. The source server responds with a valid copy of the trigger object and an HTTP response that includes the X-Cache-Related header that identifies the related data objects and their location (i.e., /current/dat/avvdat.ini, /current/dat/91599160avv.gem, /current/dat/91609161avv.gem). Based on the response header for the trigger object pkgcatalog.z, the cache manager requests a valid copy of each data object in the X-Cache-Related header to maintain the cache group in a consistent state, as described above with reference to FIG. 2D. Although FIGS. 3B-3D use the title X-Cache-Related for the header identifying the related data objects, any suitable header title may be used. Although FIGS. 3B-3D depicts an HTTP request and response, any suitable request and response format may be used.

FIG. 4 is a simplified flowchart illustrating potential operations of a cache management system that may be associated with managing related objects stored in a cache group, in accordance with various embodiments. The one or more operations may be performed by the cache manager 126, by the cache manager 116, or by a combination of the cache manager 126 and the cache manager 116. At 402, related data objects are received from a source and cached in a cache group with a trigger object based on metadata received with the related data objects or based on information retrieved from the source. The metadata may be available via a HTTP response header, such as the X-Cache-Related header in FIG. 3, or may be available in a separate file stored on the source server. For example, if the trigger object is called "trigger.file," the source server may include a file "trigger.file.metadata" that includes the metadata. At 404, a request for an individual data object in the cache group is received from a client. At 406, a determination of whether the requested data object is valid or invalid is made. In some embodiments, the determination is based on expiration information received with the data object, such as the Cache-Control header of FIG. 3. In some embodiments, the determination is based on sending a validation request to the source. If the cached version of the requested data object is valid, the process continues to 413, where the requested data object is delivered from cache to the client. If the cached version of the requested data object is not valid, the process continues to 408. At 408, a determination of whether the requested data object is a trigger object in the cache group is made, such as based on the X-Cache-Related header received with the response from the source server and stored with the data object. If the requested data object is not the trigger object, the process continues to 411, where the data object is requested from the source, and then continues to 413, where a valid copy of the requested data object is delivered to the client. In some embodiments, the requested data object is cached prior to delivering to the client. In some embodiments, the data object received from the source is delivered to the client. If the requested data object is the trigger object, the process continues to 410. At 410, all data objects in the cache group are identified as invalid (e.g., expired or stale) based on the trigger object being invalid. At 412, a valid copy of the requested data object is requested and received from the source. The valid data object includes updated metadata associated with the cache group. For example, the X-Related-Cache header may provide a modified list of related data objects in response to a second request for a trigger object. Using the example of McAfee antivirus definitions, each content release is updated to drop an old file (e.g., an earlier antivirus definition set) and add a new file (e.g., a new antivirus definition set that has been updated incrementally, such as daily, with new antivirus definitions). At 414, the valid copy of the requested data object is sent to the client and cached in the cache group. At 416, the request is made to the source to refresh and/or check the validity of each data object in the cache group to place the cache group in a consistent state. In some embodiments, the metadata identifies an order for the data objects in the cache group to be refreshed/validated. In some embodiments, the order for refreshing/validating data objects in the cache group is determined based on previous data object access patterns, where the order is determined by a next likely-to-be-accessed data object until all data objects in the cache group are in a consistent state.

FIG. 5 is a block diagram of a security ecosystem 500. In the example of FIG. 5, security ecosystem 500 may be an enterprise, a government entity, a data center, a telecommunications provider, a "smart home" with computers, smart phones, and various internet of things (IoT) devices, or any other suitable ecosystem. Security ecosystem 500 is provided herein as an illustrative and nonlimiting example of a system that may employ, and benefit from, the teachings of the present specification.

Within security ecosystem 500, one or more users 520 operate one or more client devices 510. A single user 520 and single client device 510 are illustrated here for simplicity, but a home or enterprise may have multiple users, each of which may have multiple devices, such as desktop computers, laptop computers, smart phones, tablets, hybrids, or similar.

Client devices 510 may be communicatively coupled to one another and to other network resources via local network 570. Local network 570 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 570 may also include one or more servers, firewalls, routers, switches, security appliances, antivirus servers, or other network devices, which may be single-purpose appliances, virtual machines, containers, or functions. Some functions may be provided on client devices 510.

In this illustration, local network 570 is shown as a single network for simplicity, but in some embodiments, local network 570 may include any number of networks, such as one or more intranets connected to the internet. Local network 570 may also provide access to an external network, such as the internet, via external network 572. External network 572 may similarly be any suitable type of network.

Local network 570 may connect to the internet via gateway 508, which may be responsible, among other things, for providing a logical boundary between local network 570 and external network 572. Local network 570 may also provide services such as dynamic host configuration protocol (DHCP), gateway services, router services, and switching services, and may act as a security portal across local boundary 504.

In some embodiments, gateway 508 may be a standalone internet appliance. Such embodiments are popular in cases in which ecosystem 500 includes a home or small business. In other cases, gateway 508 may run as a virtual machine or in another virtualized manner. In larger enterprises that features service function chaining (SFC) or network function virtualization (NFV), gateway 508 may be include one or more service functions and/or virtualized network functions.

Local network 570 may also include a number of discrete IoT devices. For example, local network 570 may include IoT functionality to control lighting 532, thermostats or other environmental controls 534, a security system 536, and any number of other devices 540. Other devices 540 may include, as illustrative and nonlimiting examples, network attached storage (NAS), computers, printers, smart televisions, smart refrigerators, smart vacuum cleaners and other appliances, and network connected vehicles.

Local network 570 may communicate across local boundary 504 with external network 572. Local boundary 504 may represent a physical, logical, or other boundary. External network 572 may include, for example, websites, servers, network protocols, and other network-based services. In one example, an attacker 580 (or other similar malicious or negligent actor) also connects to external network 572. A security services provider 590 may provide services to local network 570, such as security software, security updates, network appliances, or similar. For example, MCAFEE, LLC provides a comprehensive suite of security services that may be used to protect local network 570 and the various devices connected to it.

It may be a goal of users 520 to successfully operate devices on local network 570 without interference from attacker 580. In one example, attacker 580 is a malware author whose goal or purpose is to cause malicious harm or mischief, for example, by injecting malicious object 582 into client device 510. Once malicious object 582 gains access to client device 510, it may try to perform work such as social engineering of user 520, a hardware-based attack on client device 510, modifying storage 550 (or volatile memory), modifying client application 512 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 580 to leverage against local network 570.

Malicious harm or mischief may take the form of installing root kits or other malware on client devices 510 to tamper with the system, installing spyware or adware to collect personal and commercial data, defacing websites, operating a botnet such as a spam server, or simply to annoy and harass users 520. Thus, one aim of attacker 580 may be to install his malware on one or more client devices 510 or any of the IoT devices described. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 580 may also want to commit industrial or other espionage, such as stealing classified or proprietary data, stealing identities, or gaining unauthorized access to enterprise resources. Thus, the attacker's strategy may also include trying to gain physical access to one or more client devices 510 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 580. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 570 may contract with or subscribe to a security services provider 590, which may provide security services, updates, antivirus definitions, patches, products, and services. MCAFEE, LLC is a nonlimiting example of such a security services provider that offers comprehensive security and antivirus solutions. In some cases, security services provider 590 may include a threat intelligence capability such as the global threat intelligence (GTI™) database provided by MCAFEE, LLC, or similar competing products. Security services provider 590 may update its threat intelligence database by analyzing new candidate malicious objects as they appear on client networks and characterizing them as malicious or benign.

Other security considerations within security ecosystem 500 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

FIG. 6 is a block diagram of a hardware platform 600. Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 600, even though they may be scattered across a data center, or even located in different data centers.

Hardware platform 600 is configured to provide a computing device. In various embodiments, a "computing device" may be or comprise, by way of nonlimiting example, a computer, workstation, server, mainframe, virtual machine (whether emulated or on a "bare-metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol (IP) telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 600 is arranged in a point-to-point (PtP) configuration. This PtP configuration is popular for personal computer (PC) and server-type devices, although it is not so limited, and any other bus type may be used.

Hardware platform 600 is an example of a platform that may be used to implement embodiments of the teachings of this specification. For example, instructions could be stored in storage 650. Instructions could also be transmitted to the hardware platform in an ethereal form, such as via a network interface, or retrieved from another source via any suitable interconnect. Once received (from any source), the instructions may be loaded into memory 604, and may then be executed by one or more processor 602 to provide elements such as an operating system 606, operational agents 608, or data 612.

Hardware platform 600 may include several processors 602. For simplicity and clarity, only processors PROC0 602-1 and PROC1 602-2 are shown. Additional processors (such as 2, 4, 8, 16, 24, 32, 64, or 128 processors) may be provided as necessary, while in other embodiments, only one processor may be provided. Details of processors 602 are not illustrated in this FIGURE. Processors may have any number of cores, such as 1, 2, 4, 8, 16, 24, 32, 64, or 128 cores.

Processors 602 may be any type of processor and may communicatively couple to chipset 616 via, for example, PtP interfaces. Chipset 616 may also exchange data with other elements, such as a high-performance graphics adapter 622. In alternative embodiments, any or all of the PtP links illustrated in FIG. 6 could be implemented as any type of bus, or other configuration rather than a PtP link. In various embodiments, chipset 616 may reside on the same die or package as a processor 602 or on one or more different dies or packages. Each chipset may support any suitable number of processors 602. A chipset 616 (which may be a chipset, uncore, Northbridge, Southbridge, or other suitable logic and circuitry) may also include one or more controllers to couple other components to one or more CPUs.

Two memories, 604-1 and 604-2 are shown, connected to PROC0 602-1 and PROC1 602-2, respectively. As an example, each processor is shown connected to its memory in a direct memory access (DMA) configuration, though other memory architectures are possible, including ones in which memory 604 communicates with processor 602 via a bus. For example, some memories may be connected via a system bus, or in a data center, memory may be accessible in a remote DMA (RDMA) configuration.

Memory 604 may include any form of volatile or nonvolatile memory including, without limitation, magnetic media (e.g., one or more tape drives), optical media, flash, random access memory (RAM), double data rate RAM (DDR RAM) non-volatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 604 may be used for short, medium, and/or long-term storage. Memory 604 may store any suitable data or information utilized by platform logic. In some embodiments, memory 604 may also comprise storage for instructions that may be executed by the cores of processors 602 or other processing elements (e.g., logic resident on chipsets 616) to provide functionality.

In certain embodiments, memory 604 may comprise a relatively low-latency volatile main memory, while storage 650 may comprise a relatively higher-latency nonvolatile memory. However, memory 604 and storage 650 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 604 and storage 650, for example, in a single physical memory device, and in other cases, memory 604 and/or storage 650 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 622 may be configured to provide a human-readable visual output, such as a command-line interface (CLI) or graphical desktop such as Microsoft Windows, Apple OSX desktop, or a Unix/Linux X Window System-based desktop. Graphics adapter 622 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 622 may include a hardware graphics card, which may have its own memory and its own graphics processing unit (GPU).

Chipset 616 may be in communication with a bus 628 via an interface circuit. Bus 628 may have one or more devices that communicate over it, such as a bus bridge 632, I/O devices 635, accelerators 646, communication devices 640, and a keyboard and/or mouse 638, by way of nonlimiting example. In general terms, the elements of hardware platform 600 may be coupled together in any suitable manner. For example, a bus may couple any of the components together. A bus may include any known interconnect, such as a multi-drop bus, a mesh interconnect, a fabric, a ring interconnect, a round-robin protocol, a point-to-point interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 640 can broadly include any communication not covered by a network interface and the various I/O devices described herein. This may include, for example, various USB, FireWire, Lightning, or other serial or parallel devices that provide communications.

I/O Devices 635 may be configured to interface with any auxiliary device that connects to hardware platform 600 but that is not necessarily a part of the core architecture of hardware platform 600. A peripheral may be operable to provide extended functionality to hardware platform 600, and may or may not be wholly dependent on hardware platform 600. In some cases, a peripheral may be a computing device in its own right. Peripherals may include input and output devices such as displays, terminals, printers, keyboards, mice, modems, data ports (e.g., serial, parallel, universal serial bus (USB), Firewire, or similar), network controllers, optical media, external storage, sensors, transducers, actuators, controllers, data acquisition buses, cameras, microphones, speakers, or external storage, by way of nonlimiting example.

In one example, audio I/O 642 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 632 may be in communication with other devices such as a keyboard/mouse 638 (or other input devices such as a touch screen, trackball, etc.), communication devices 640 (such as modems, network interface devices, peripheral interfaces such as PCI or PCIe, or other types of communication devices that may communicate through a network), audio I/O 642, and/or accelerators 646. In alternative embodiments, any portions of the bus architectures could be implemented with one or more PtP links.

Operating system 606 may be, for example, Microsoft Windows, Linux, UNIX, Mac OS X, iOS, MS-DOS, or an embedded or real-time operating system (including embedded or real-time flavors of the foregoing). In some embodiments, a hardware platform 600 may function as a host platform for one or more guest systems that invoke application (e.g., operational agents 608).

Operational agents 608 may include one or more computing engines that may include one or more non-transitory computer-readable mediums having stored thereon executable instructions operable to instruct a processor to provide operational functions. At an appropriate time, such as upon booting hardware platform 600 or upon a command from operating system 606 or a user or security administrator, processor 602 may retrieve a copy of the operational agent (or software portions thereof) from storage 650 and load it into memory 604. Processor 602 may then iteratively execute the instructions of operational agents 608 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 600 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel Omni-Path Architecture (OPA), TrueScale, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 600 may be virtualized, in particular the processor (s) and memory. For example, a virtualized environment may run on OS 606, or OS 606 could be replaced with a hypervisor or virtual machine manager. In this configuration, a virtual machine running on hardware platform 600 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 6 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), field-programmable gate arrays (FPGAs), and other semiconductor chips.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and a non-volatile memory. Thus, for example, an "engine" as described above could include instructions stored within a memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, non-transitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, non-transitory computer-readable storage media having stored thereon executable instructions that, when executed, cause a hardware platform or other computing system, to carry out a method or procedure. For example, the instructions could be executable object code, including software instructions executable by a processor. The one or more tangible, non-transitory computer-readable storage media could include, by way of illustrative and non-limiting example, a magnetic media (e.g., hard drive), a flash memory, a read-only memory (ROM), optical media (e.g., CD, DVD, Blu-Ray), non-volatile random access memory (NVRAM), non-volatile memory (NVM) (e.g., Intel 3D Xpoint), or other non-transitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a non-limiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the invention, as claimed, and the exclusion of certain elements from the FIGURES is not intended to imply that the element is to be excluded from the invention as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

Example Implementations

The following paragraphs provide various examples of the embodiments disclosed herein.

Example 1 is an apparatus, including a memory element operable to store instructions; and a processor operable to execute the instructions, such that the apparatus is configured to cache a first data object and a second data object received from a source in a cache group based on metadata received from the source, wherein the metadata identifies the first and second data objects as related and identifies the first data object as a trigger object; receive a request from a client for the first data object; identify, based on a determination that the first data object is invalid and that the first data object is the trigger object, the first data object and the second data object as invalid; request a valid first data object and a valid second data object from the source; and cache the valid first data object and the valid second data object, received from the source, in the cache group.

Example 2 may include the subject matter of Example 1, and may be further configured to send the valid first data object to the client.

Example 3 may include the subject matter of any of Examples 1 and 2, and may be further configured to receive a request from the client for the second data object; retrieve the valid second data object from the cache; and send the valid second data object to the client.

Example 4 may include the subject matter of any of Examples 1-3, and may further specify that the first data object includes a first header and the second data object includes a second header, and wherein the metadata is included in the first header.

Example 5 may include the subject matter of any of Examples 1-4, and may further specify that the first data object includes a first header and the second data object includes a second header, and wherein the first header includes instructions to retrieve the metadata from the source.

Example 6 may include the subject matter of any of Examples 1-5, and may further specify that the first and second data objects are two data objects of a plurality of data objects, and may be further configured to identify, based on a determination that the first data object is invalid and that the first data object is the trigger object, the plurality of data objects as invalid.

Example 7 may include the subject matter of Example 6, and may be further configured to request for each individual data object in the plurality of data objects a valid data object from the source; and cache for each individual data object in the plurality of data objects the valid data object, received from the source, in the cache group.

Example 8 may include the subject matter of any of Examples 1-7, and may further specify that the first and second data objects are data objects in an anti-malware definition set.

Example 9 is a method, including storing, in a cache, a first data object and a second data object in a cache group based on metadata received from a source, wherein the cache group includes a trigger object; receiving a request from a client for the first data object; determining whether the first data object is valid; retrieving, based on a determination that the first data object is valid, the first data object from the cache; and sending the first data object to the client.

Example 10 may include the subject matter of Example 9, and may further include determining whether the first data object is the trigger object; identifying, based on a determination that the first data object is invalid and that the first data object is the trigger object, the first data object and the second data object as invalid; requesting a valid first data object from the source; and sending the valid first data object, received from the source, to the client.

Example 11 may include the subject matter of Example 10, and may further include caching the valid first data object in the cache group.

Example 12 may include the subject matter of Example 11, and may further include requesting, based on the second data object being identified as invalid by the trigger object, a valid second data object from the source; and caching the valid second data object, received from the source, in the cache group.

Example 13 may include the subject matter of Example 12, and may further include receiving a request from the client for the second data object; determining whether the second data object is valid; retrieving, based on a determination that the second data object is valid, the second data object from the cache; and sending the second data object to the client.

Example 14 may include the subject matter of any of Examples 9-13, and may further specify that the first and second data objects are data objects in an anti-malware definition set.

Example 15 may include the subject matter of Example 14, and may further specify that the first data object is a first antivirus definition set and the second data object is an incremental update of the first antivirus definition set.

Example 16 is at least one non-transitory computer-readable medium including one or more instructions that when executed by a processor, cause the processor to receive a first data object having a first header and a second data object having a second header from a source, wherein the first header includes metadata identifying the first data object as related to the second data object and identifying the first data object as a trigger object; store, in a cache, the first data object and the second data object in a cache group based on the metadata received from the source; receive a request from a client for the first data object; determine whether the first data object is valid; determine whether the first data object is the trigger object; identify, based on a determination that the first data object is invalid and the trigger object, the first data object and the second data object as invalid; request a valid first data object from the source; receive the valid first data object from the source; cache the valid first data object in the cache group; request a valid second data object from the source; receive the valid second data object from the source; and cache the valid second data object in the cache group.

Example 17 may include the subject matter of Example 16, and may further include one or more instructions that when executed by a processor, cause the processor to send the valid first data object, received from the source, to the client.

Example 18 may include the subject matter of any of Examples 16 and 17, and may further specify that the first and second data objects are data objects in an anti-malware definition set.

Example 19 may include the subject matter of any of Examples 17 and 18, and may further include one or more instructions that when executed by a processor, cause the processor to receive a request from the client for the second data object; determine whether the second data object is valid; retrieve, based on a determination that the second data object is valid, the second data object from the cache; and send the second data object to the client.

Example 20 may include the subject matter of Example 16, and may further specify that the client is a first client, and may further include one or more instructions that when executed by a processor, cause the processor to receive a request from a second client for the first data object; determine whether the first data object is valid; retrieve, based on a determination that the first data object is valid, the first data object from the cache; and send the first data object to the client.

Example 21 is an apparatus, including a memory element operable to store instructions; and a processor operable to execute the instructions, such that the apparatus is configured to store a first data object and a second data object, wherein the first and second data objects are related; create metadata instructing a cache to store the first and second data object in a cache group and identifying the first data object as a trigger object; receive a request from the cache for the first data object; and send the first data object having a first header to the cache, wherein the first header includes the metadata.

The invention claimed is:

1. An apparatus, comprising:
a memory element operable to store instructions; and
a processor operable to execute the instructions, such that the apparatus is configured to:
cache a first data object and a second data object received from a source in a cache group based on metadata received from the source, wherein the metadata identifies the first and second data objects as related and identifies the first data object as a trigger object, wherein the trigger object maintains all content within the cache group in a consistent state, and wherein the second data object is not the trigger object and does not maintain all content within the cache group in a consistent state;
receive a request from a client for the first data object;
identify, based on a determination that the first data object is invalid and that the first data object is the trigger object, the first data object and the second data object as invalid;
request a valid first data object and a valid second data object from the source; and
cache the valid first data object and the valid second data object, received from the source, in the cache group.

2. The apparatus of claim 1, further configured to:
send the valid first data object to the client.

3. The apparatus of claim 1, further configured to:
receive a request from the client for the second data object;
retrieve the valid second data object from the cache; and
send the valid second data object to the client.

4. The apparatus of claim 1, wherein the first data object includes a first header and the second data object includes a second header, and wherein the metadata is included in the first header.

5. The apparatus of claim 1, wherein the first data object includes a first header and the second data object includes a second header, and wherein the first header includes instructions to retrieve the metadata from the source.

6. The apparatus of claim 1, wherein the first and second data objects are two data objects of a plurality of data objects, and further configured to:
identify, based on a determination that the first data object is invalid and that the first data object is the trigger object, the plurality of data objects as invalid.

7. The apparatus of claim 6, further configured to:
request for each individual data object in the plurality of data objects a valid data object from the source; and
cache for each individual data object in the plurality of data objects the valid data object, received from the source, in the cache group.

8. The apparatus of claim 1, wherein the first and second data objects are data objects in an anti-malware definition set.

9. A method, comprising:
storing, in a cache, a first data object and a second data object in a cache group based on metadata received from a source, wherein the first data object is a trigger object and maintains all content within the cache group in a consistent state, and wherein the second data object is not the trigger object and does not maintain all content within the cache group in a consistent state;
receiving a request from a client for the first data object;
determining whether the first data object is valid;
retrieving, based on a determination that the first data object is valid, the first data object from the cache; and
sending the first data object to the client.

10. The method of claim 9, further comprising:
determining whether the first data object is the trigger object;
identifying, based on a determination that the first data object is invalid and that the first data object is the trigger object, the first data object and the second data object as invalid;
requesting a valid first data object from the source; and
sending the valid first data object, received from the source, to the client.

11. The method of claim 10, further comprising:
caching the valid first data object in the cache group.

12. The method of claim 11, further comprising:
requesting, based on the second data object being identified as invalid by the trigger object, a valid second data object from the source; and
caching the valid second data object, received from the source, in the cache group.

13. The method of claim 12, further comprising:
receiving a request from the client for the second data object;
determining whether the second data object is valid;
retrieving, based on a determination that the second data object is valid, the second data object from the cache; and
sending the second data object to the client.

14. The method of claim 9, wherein the first and second data objects are data objects in an anti-malware definition set.

15. The method of claim 14, wherein the first data object is a first antivirus definition set and the second data object is an incremental update of the first antivirus definition set.

16. At least one non-transitory computer-readable medium comprising one or more instructions that when executed by a processor, cause the processor to:
- receive a first data object having a first header and a second data object having a second header from a source, wherein the first header includes metadata identifying the first data object as related to the second data object and identifying the first data object as a trigger object, wherein the trigger object maintains all content within the cache group in a consistent state, and wherein the second data object is not the trigger object and does not maintain all content within the cache group in a consistent state;
- store, in a cache, the first data object and the second data object in a cache group based on the metadata received from the source;
- receive a request from a client for the first data object;
- determine whether the first data object is valid;
- determine whether the first data object is the trigger object;
- identify, based on a determination that the first data object is invalid and the trigger object, the first data object and the second data object as invalid;
- request a valid first data object from the source;
- receive the valid first data object from the source;
- cache the valid first data object in the cache group;
- request a valid second data object from the source;
- receive the valid second data object from the source; and
- cache the valid second data object in the cache group.

17. The at least one non-transitory computer-readable medium of claim 16, further comprising one or more instructions that when executed by a processor, cause the processor to:
- send the valid first data object, received from the source, to the client.

18. The at least one non-transitory computer-readable medium of claim 16, wherein the first and second data objects are data objects in an anti-malware definition set.

19. The at least one non-transitory computer-readable medium of claim 17, further comprising one or more instructions that when executed by a processor, cause the processor to:
- receive a request from the client for the second data object;
- determine whether the second data object is valid;
- retrieve, based on a determination that the second data object is valid, the second data object from the cache; and
- send the second data object to the client.

20. The at least one non-transitory computer-readable medium of claim 16, wherein the client is a first client, and further comprising one or more instructions that when executed by a processor, cause the processor to:
- receive a request from a second client for the first data object;
- determine whether the first data object is valid;
- retrieve, based on a determination that the first data object is valid, the first data object from the cache; and
- send the first data object to the client.

* * * * *